US012590858B2

(12) United States Patent
Yee et al.

(10) Patent No.: US 12,590,858 B2
(45) Date of Patent: Mar. 31, 2026

(54) PROTECTIVE CAP FOR PRESSURE SENSORS

(71) Applicant: Apple Inc., Cupertino, CA (US)

(72) Inventors: Seow Yuen Yee, Mountain View, CA (US); Ashwin Balasubramanian, Sunnyvale, CA (US); Eric T. Chiang, San Francisco, CA (US); Michael J. Glickman, Mountain View, CA (US); Roberto M. Ribeiro, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 203 days.

(21) Appl. No.: 18/216,440

(22) Filed: Jun. 29, 2023

(65) Prior Publication Data

US 2024/0035912 A1    Feb. 1, 2024

Related U.S. Application Data

(60) Provisional application No. 63/394,261, filed on Aug. 1, 2022.

(51) Int. Cl.
G01L 19/06          (2006.01)
(52) U.S. Cl.
CPC ...... G01L 19/0636 (2013.01); G01L 19/0654 (2013.01)
(58) Field of Classification Search
CPC . G01L 19/147; G01L 9/0072; G01L 19/0645; G01L 19/0084; G01L 13/025; G01L 19/0007; G01L 9/0042; G01L 19/0038; G01L 9/0073; G01L 9/0075; G01L 9/0054; G01L 9/0055; G01L 19/04; G01L 7/00; G01L 7/04; G01L 19/148; G01L 19/14; G01L 19/143; G01L 17/00; G01L 7/18; G01L 19/0092; G01L 15/00; G01L 9/0051; G01L 7/041; G01L 9/12; G01L 9/065; G01L 19/0618; G01L 9/0052; G01L 9/125; G01L 7/16; G01L 19/0609; G01L 19/003; G01L 9/007; G01L 19/0627; G01L 19/0046; G01L 9/0022; G01L 9/06; G01L 19/0636; G01L 7/084; G01L 13/02; G01L 19/0023; G01L 19/142; G01L 7/043; G01L 19/08; G01L 9/0002; G01L 19/02;

(Continued)

(56) References Cited

U.S. PATENT DOCUMENTS 8,934,263 B2 *   1/2015   Eckhardt ............. G01L 19/0654
                                                             73/756
2006/0065058 A1 *   3/2006   Eriksen ............... G01L 19/0038
                                                             73/756

(Continued)

FOREIGN PATENT DOCUMENTS

CN          219776960 U   *   9/2023
WO     WO-2020108718 A1  *   6/2020   ......... G01L 19/0645

*Primary Examiner* — Andre J Allen
(74) *Attorney, Agent, or Firm* — BAKERHOSTETLER

(57)          ABSTRACT

Aspects of the subject technology relate to an apparatus having a housing including a port exposed to an environment. A pressure sensor is disposed within the housing to measure a pressure of the environment. A medium partially fills a sensor cavity or is coated over the pressure sensor, and a cap including multiple openings is disposed over the pressure sensor. The openings of the cap are arranged to be offset from the port.

21 Claims, 5 Drawing Sheets

(58) Field of Classification Search

CPC ....... G01L 9/008; G01L 19/141; G01L 9/006; G01L 11/02; G01L 19/0672; G01L 23/10; G01L 23/18; G01L 19/0681; G01L 9/0077; G01L 19/12; G01L 27/005; G01L 7/082; G01L 9/0044; G01L 19/0015; G01L 19/0069; G01L 7/063; G01L 9/0001; G01L 19/146; G01L 21/12; G01L 27/002; G01L 27/007; G01L 9/16; G01L 11/00; G01L 19/00; G01L 9/0026; G01L 9/0089; G01L 9/045; G01L 9/14; G01L 19/0654; G01L 1/2281; G01L 11/025; G01L 13/026; G01L 11/008; G01L 7/22; G01L 13/00; G01L 9/0047; G01L 7/08; G01L 9/0076; G01L 9/0025; G01L 9/0035; G01L 19/0061; G01L 9/0005; G01L 9/0041; G01L 9/0019; G01L 9/08; G01L 9/10; G01L 21/00; G01L 9/04; G01L 11/006; G01L 19/086; G01L 9/00; G01L 9/0008; G01L 1/18; G01L 11/004; G01L 19/069; G01L 9/0057; G01L 19/083; G01L 19/06; G01L 19/10; G01L 19/16; G01L 9/0016; G01L 13/023; G01L 7/048; G01L 9/0048; G01L 9/0027; G01L 9/0086; G01L 9/0079; G01L 11/04; G01L 1/20; G01L 9/0091; G01L 27/00; G01L 11/002; G01L 23/24; G01L 7/182; G01L 1/02; G01L 19/0063; G01L 7/166; G01L 23/22; G01L 9/0036; G01L 9/0061; G01L 9/0039; G01L 23/125; G01L 19/145; G01L 9/0013; G01L 21/04; G01L 9/0045; G01L 9/0092; G01L 1/142; G01L 7/104; G01L 9/0033; G01L 9/0083; G01L 9/0098; G01L 1/2293; G01L 7/24; G01L 9/02; G01L 21/22; G01L 9/0029; G01L 7/022; G01L 1/205; G01L 9/0064; G01L 23/08; G01L 5/14; G01L 13/06; G01L 23/16; G01L 7/088; G01L 7/163; G01L 9/0007; G01L 23/222; G01L 1/16; G01L 1/2287; G01L 9/0085; G01L 9/025; G01L 1/2212; G01L 21/14; G01L 9/0004; G01L 23/02; G01L 9/003; G01L 9/085; G01L 1/14; G01L 1/148; G01L 9/0058; G01L 9/105; G01L 7/02; G01L 7/061; G01L 9/002; G01L 1/2231; G01L 13/028; G01L 9/0095; G01L 23/28; G01L 1/162; G01L 19/0076; G01L 7/12; G01L 9/0038; G01L 9/0032; G01L 21/10; G01L 7/024; G01L 19/149; G01L 1/246; G01L 7/086; G01L 1/005; G01L 5/228; G01L 7/06; G01L 1/2206; G01L 7/102; G01L 13/021; G01L 27/02; G01L 1/2262; G01L 1/24; G01L 1/26; G01L 23/00; G01L 9/0094; G01L 19/144; G01L 9/0082; G01L 1/125; G01L 9/0097; G01L 1/2268; G01L 11/06; G01L 21/30; G01L 21/34; G01L 23/221; G01L 7/187; G01L 7/20; G01L 1/146; G01L 23/26; G01L 7/068; G01L 1/144; G01L 1/225; G01L 23/32; G01L 7/14; G01L 1/165; G01L 23/12; G01L 1/241; G01L 13/04; G01L 7/045; G01L 1/086; G01L 1/22; G01L 7/108; G01L 9/18; G01L 1/127; G01L 17/005; G01L 5/18; G01L 1/245; G01L 21/32; G01L 1/183; G01L 1/2218; G01L 9/0023; G01L 1/243; G01L 23/145; G01L 5/0047; G01L 5/0076; G01L 9/0088; G01L 1/106; G01L 1/10; G01L 9/001; G01L 1/186; G01L 23/223; G01L 25/00; G01L 5/165; G01L 5/226; G01L 9/0017; G01L 1/044; G01L 3/245; G01L 9/005; G01L 1/08; G01L 21/16; G01L 3/1485; G01L 5/0038; G01L 5/162; G01L 5/225; G01L 7/026; G01L 7/065; G01L 9/0014; G01L 1/04; G01L 1/242; G01L 21/24; G01L 3/10; G01L 5/0004; G01L 5/0052; G01L 5/24; G01L 7/10; G01L 1/00; G01L 1/103; G01L 1/2275; G01L 1/247; G01L 21/02; G01L 21/26; G01L 23/225; G01L 3/102; G01L 3/105; G01L 5/223; G01L 7/028; G01L 9/0011; G01L 5/00; G01L 5/0028; G01L 5/243; G01L 1/083; G01L 1/12; G01L 21/36; G01L 23/04; G01L 23/14; G01L 23/30; G01L 3/103; G01L 5/0033; G01L 5/102; G01L 5/133; G01L 5/1627; G01L 5/166; G01L 7/185; G01L 1/255; G01L 21/08; G01L 5/0057; G01L 5/22; G01L 1/042; G01L 1/122; G01L 1/2225; G01L 1/2243; G01L 1/2256; G01L 1/248; G01L 2009/0067; G01L 2009/0069; G01L 21/06; G01L 23/06; G01L 3/00; G01L 3/06; G01L 3/1478; G01L 3/1492; G01L 3/18; G01L 3/24; G01L 3/242; G01L 5/0061; G01L 5/08; G01L 5/10; G01L 5/101; G01L 5/108; G01L 5/16; G01L 5/161; G01L 5/167; G01L 5/28; G01L 1/046; G01L 2009/0066; G01L 2019/0053; G01L 23/085; G01L 23/20; G01L 5/0071; G01L 5/008; G01L 5/06; G01L 5/171; G01L 7/106

USPC ..................................................... 73/700–756

See application file for complete search history.

(56) References Cited

U.S. PATENT DOCUMENTS

| | | | |
|---|---|---|---|
| 2015/0211901 A1* | 7/2015 | Thomas | G01D 11/245 |
| | | | 73/431 |
| 2022/0026300 A1* | 1/2022 | Jacobsen | G01L 19/0645 |
| 2023/0243712 A1* | 8/2023 | Barton | G01L 19/0609 |
| | | | 73/707 |

* cited by examiner

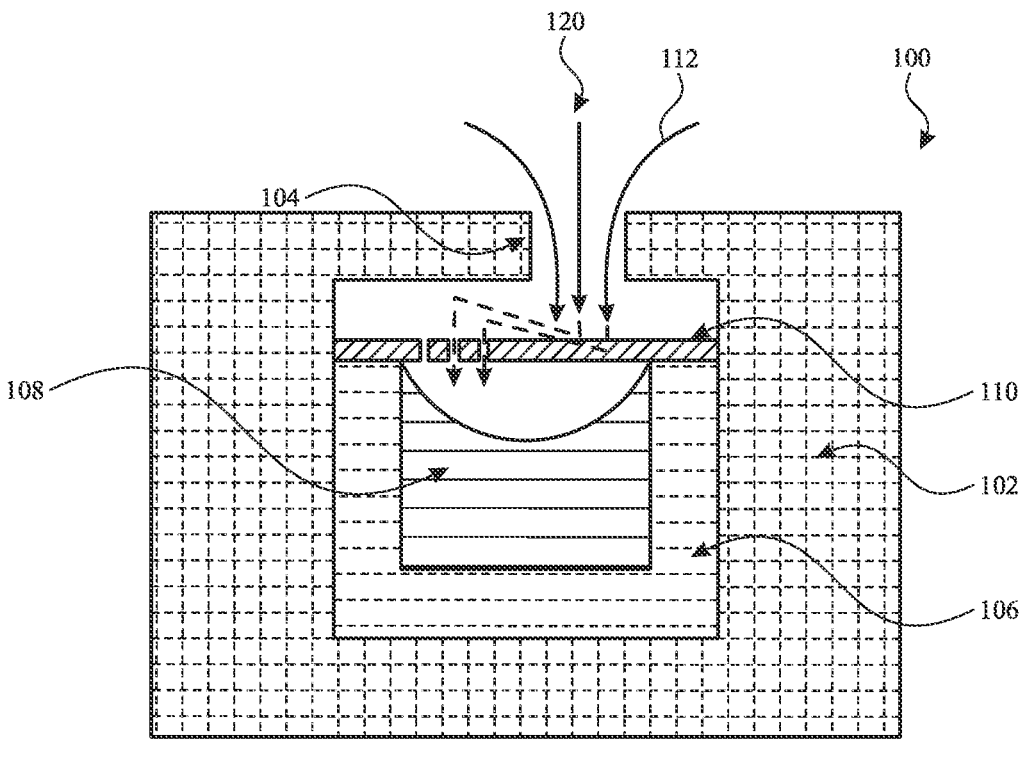
FIG. 1
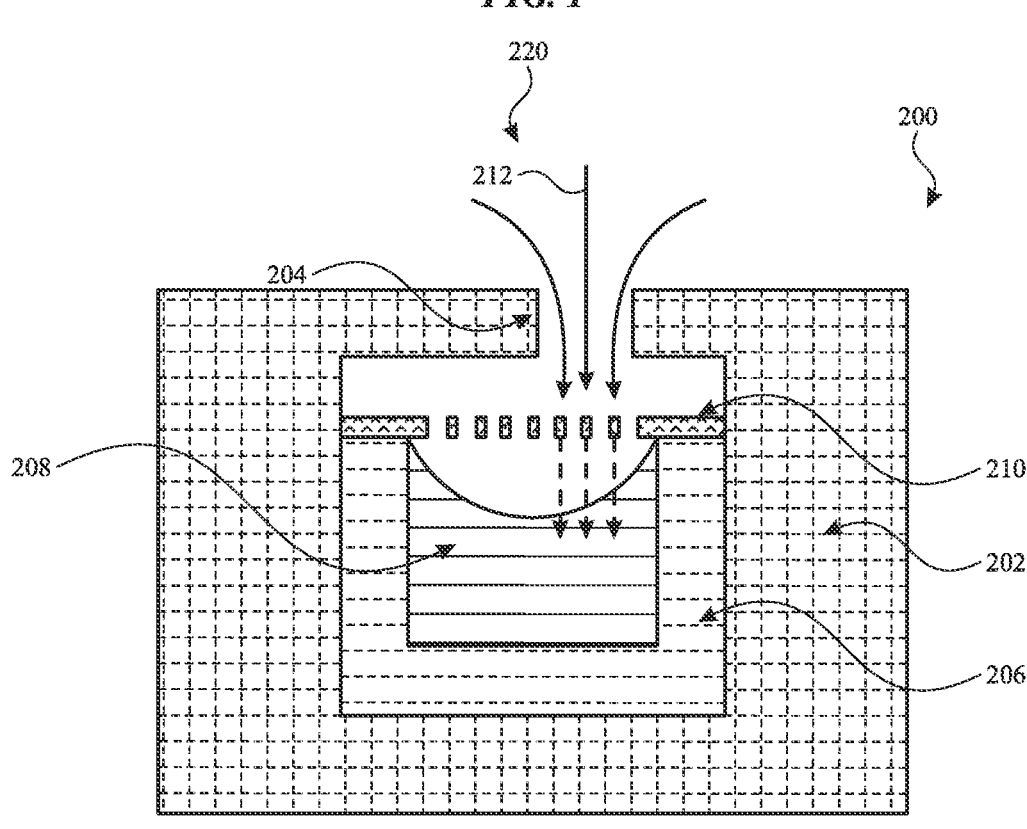
FIG. 2

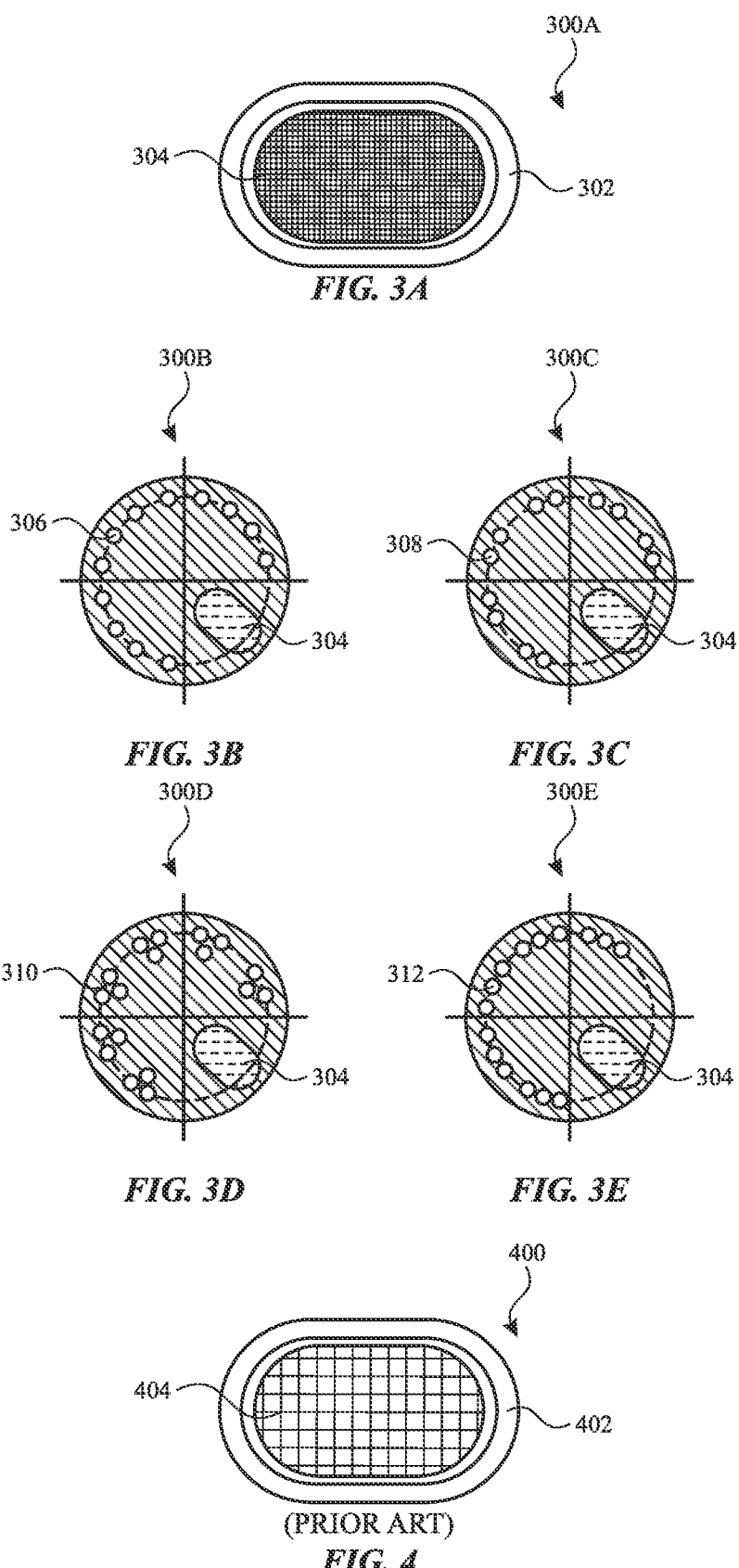
FIG. 3A
FIG. 3B
FIG. 3C
FIG. 3D
FIG. 3E
(PRIOR ART)
FIG. 4

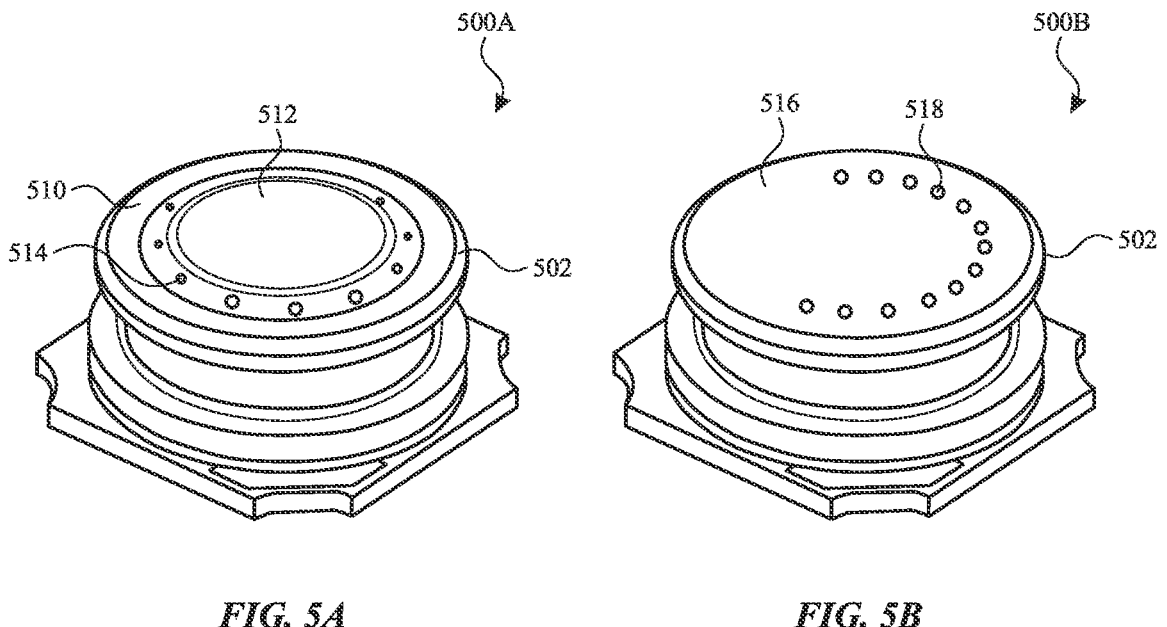
FIG. 5A                    FIG. 5B
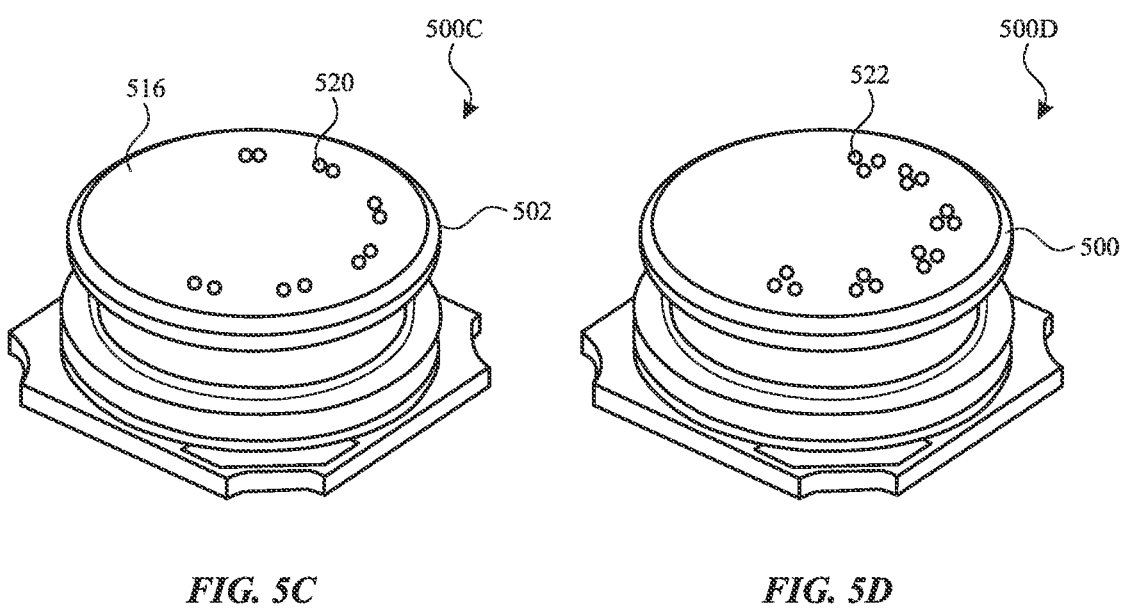
FIG. 5C                    FIG. 5D

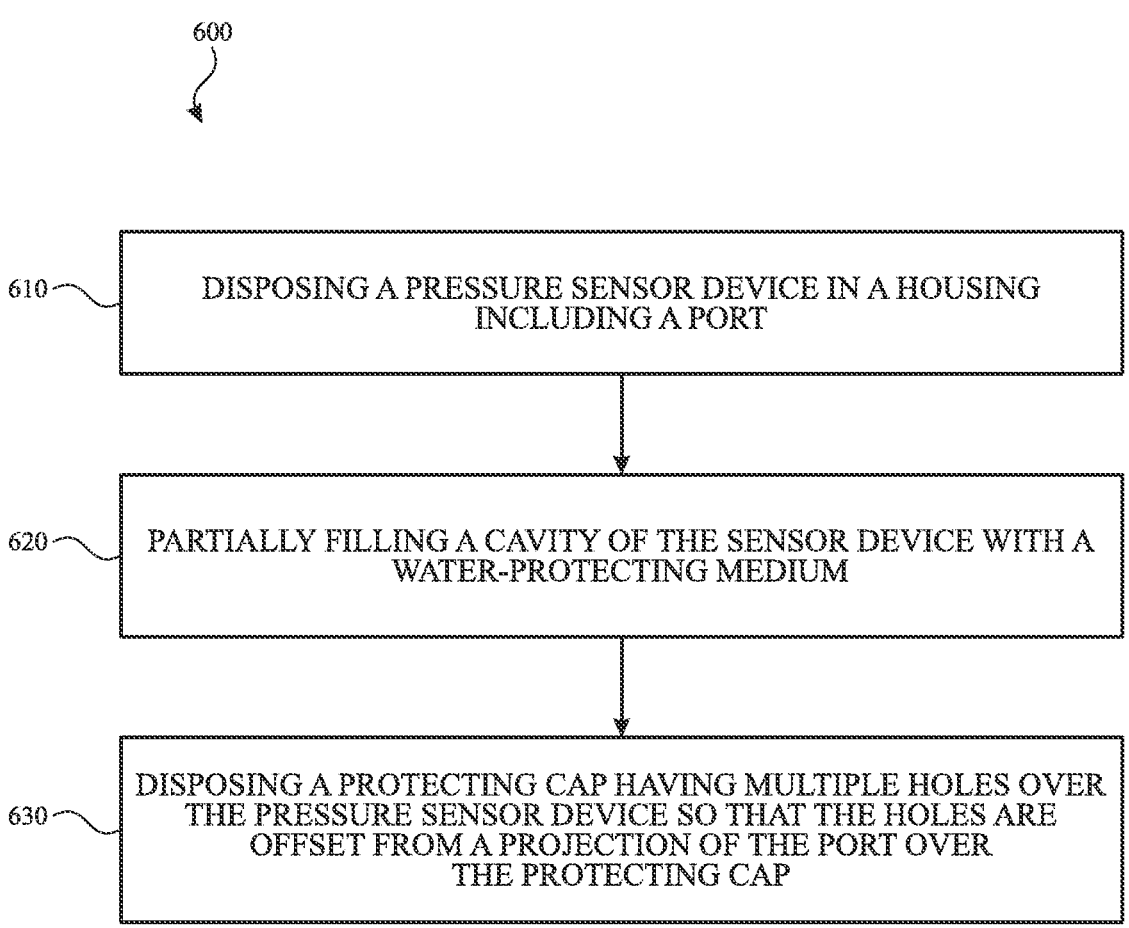
*600*
610 — DISPOSING A PRESSURE SENSOR DEVICE IN A HOUSING INCLUDING A PORT
620 — PARTIALLY FILLING A CAVITY OF THE SENSOR DEVICE WITH A WATER-PROTECTING MEDIUM
630 — DISPOSING A PROTECTING CAP HAVING MULTIPLE HOLES OVER THE PRESSURE SENSOR DEVICE SO THAT THE HOLES ARE OFFSET FROM A PROJECTION OF THE PORT OVER THE PROTECTING CAP
*FIG. 6*

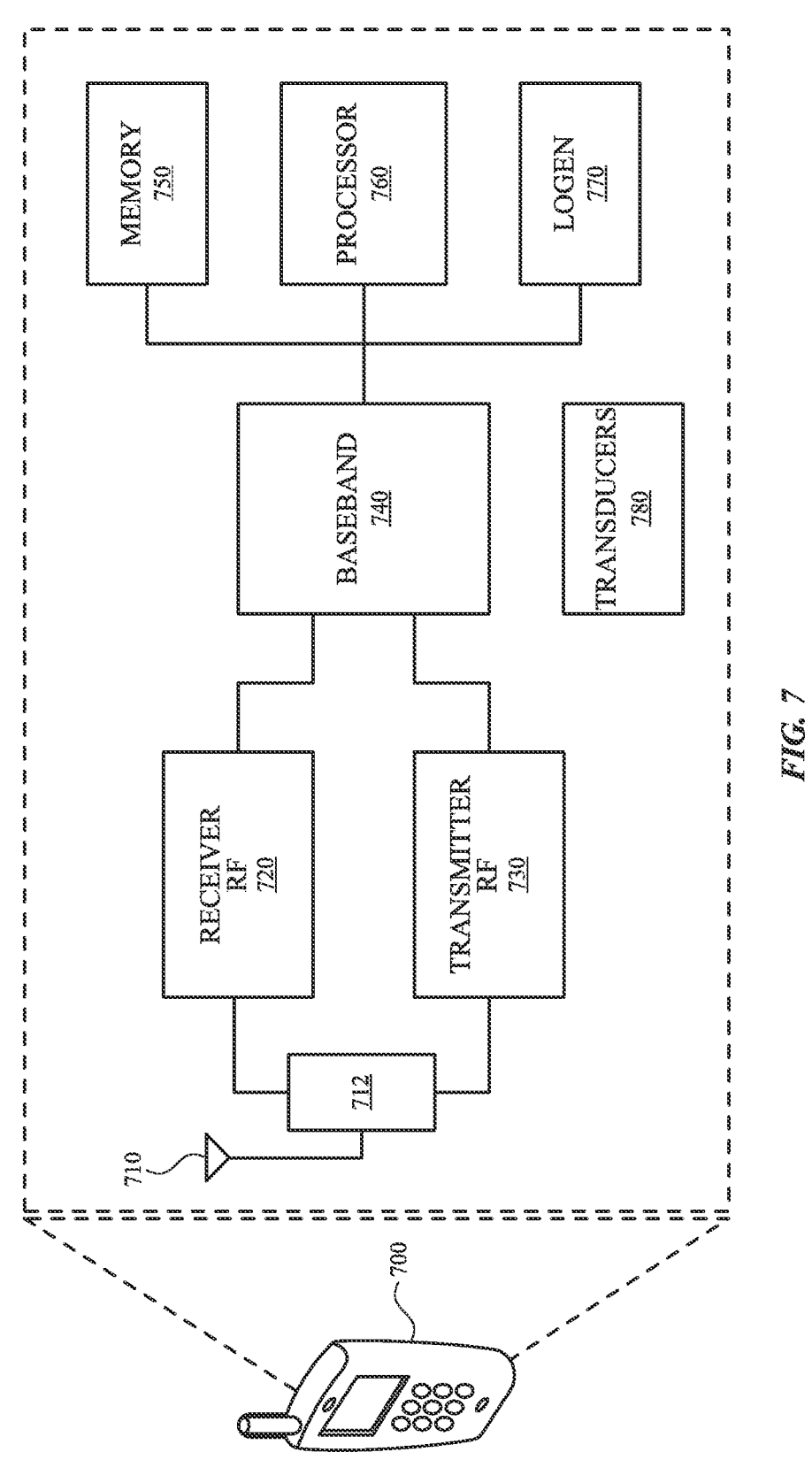
*FIG. 7*

PROTECTIVE CAP FOR PRESSURE SENSORS

CROSS-REFERENCE TO RELATED APPLICATION(S)

This application claims the benefit of U.S. Provisional Application Ser. No. 63/394,261, entitled "PROTECTIVE CAP FOR PRESSURE SENSORS" and filed on Aug. 1, 2022, the disclosure of which is expressly incorporated by reference herein in its entirety.

TECHNICAL FIELD

The present description relates generally to electronic devices and, more particularly, but not exclusively, to a protective cap for pressure sensors that can be used in various electronic devices.

BACKGROUND

Pressure sensors are being increasingly integrated into wearable and portable devices, such as smartwatches and smartphones. The pressure sensors integrated in smart devices can be used to measure elevation and depth in water, as well as other applications. Barometric or water pressure sensors need to be exposed to the environment in order to measure pressure. Directly exposing an integrated pressure sensor to some environments can lead to permanent damage or parametric shifts due to contaminants (e.g., dust, salt, water, etc.) in the environment. A typical approach to address this issue is encapsulating the sensor with a water-proof medium or using a waterproof membrane or mesh (or some combination of these solutions). These mitigations are still susceptible to mechanical failure modes, such as exposures to high velocity water (e.g., from water sports) or damage due to intentional or accidental probing, for example, during cleaning a device or misusing a port of the device.

BRIEF DESCRIPTION OF THE DRAWINGS

Certain features of the subject technology are set forth in the appended claims. However, for purposes of explanation, several aspects of the subject technology are set forth in the following figures.

FIG. 1 is a schematic diagram illustrating an example of a pressure-sensing apparatus with a protective cap, in accordance with various aspects of the subject technology.

FIG. 2 is a schematic diagram illustrating an existing pressure-sensing apparatus with a mesh cap.

FIGS. 3A, 3B, 3C, 3D, and 3E are diagrams illustrating top views of examples of protective caps of the pressure-sensing apparatus of FIG. 1, in accordance with various aspects of the subject technology.

FIG. 4 is a schematic diagram illustrating a top view of the port of the existing pressure-sensing apparatus of FIG. 2.

FIGS. 5A, 5B, 5C, and 5D are diagrams illustrating examples of a sensor device with domed protective cap and sensor devices with flat protective caps, in accordance with various aspects of the subject technology.

FIG. 6 is a flow diagram illustrating an example process of protecting a pressure-sensor device, in accordance with various aspects of the subject technology.

FIG. 7 illustrates a wireless communication device within which some aspects of the subject technology are implemented.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block-diagram form in order to avoid obscuring the concepts of the subject technology.

The subject disclosure is directed to an apparatus having a housing including a port exposed to an environment. A pressure sensor is disposed within the housing to measure a pressure of the environment. A medium protects the pressure sensor from environmental aggressors such as water or chemicals. The medium can be coated (e.g., uniformly) over the pressure sensor or can partially fill a sensor cavity, and a cap having multiple openings is disposed over the pressure sensor. The openings of the cap are arranged to be offset from the port.

In one or more implementations, the subject technology relates to an electronic device, for example, a portable communication device such as a smartphone, a smartwatch, or other electronic devices. The electronic device can include a pressure-sensing apparatus and a processor to process pressure signals. In some aspects, the pressure-sensing apparatus includes a pressure-sensor device disposed within a housing that includes a port that is used to measure a pressure of an environment and generate the pressure signals. A water-proofing medium (e.g., a gel or a conformal coating of a material such as polymer for instance perylene) protects the pressure-sensor device from environmental aggressors such as water and chemicals, and a cap is disposed over the pressure-sensor device. The cap includes multiple openings, which are arranged to be offset from a projection of the port on the cap.

In one or more aspects, the subject disclosure is directed to an apparatus including a pressure-sensor device that is disposed within a housing and can measure a pressure of a surrounding environment. A gel partially fills a cavity of the pressure-sensor device, and a protective cap is disposed over the pressure-sensor device. The protective cap includes a plurality of openings that are arranged to be offset from a projection of a port of the housing on the protective cap.

FIG. 1 is a schematic diagram illustrating an example of a pressure-sensing apparatus 100 with a protective cap 110, in accordance with various aspects of the subject technology. The pressure-sensing apparatus 100 (hereinafter, apparatus 100) includes a housing 102, a port 104, a pressure-sensor device 106, a waterproofing medium 108 (e.g., a gel), and the protective cap 110. The housing can be made, for example, from a metal such as aluminum or stainless steel, but is not limited to these metals, and can be made of any qualified metal or other material. The port 104 is an opening in the housing 102 and allows exposure to the surrounding environment. In some aspects, the surrounding environment can be a liquid such as water, in which case the pressure-sensor device 106 is a liquid (water) pressure sensor and the port 104 exposes the apparatus 100 to the liquid (water) that forms an inflow 112. In other aspects, the surrounding environment can be an atmosphere, for which case the pressure-sensor device 106 is a barometric pressure sensor and the port 104 exposes the apparatus 100 to the inflow 112, which in this case can be a gas (e.g., air). The pressure-sensor device 106 is protected from the potentially harsh environments it needs to operate in (e.g., water) and damage due to probing, or the like. In addition, this protection should reduce any error in the pressure reading of the pressure-sensor device 106, for example, due to noise, offset, or latency in pressure measurement.

The protective cap 110 can be made of a mechanically sturdy and durable material such as a metal or a polymer. In some implementations, the metal can be stainless steel, titanium, tungsten, chromium, or other strong metals. The material for the protective cap 110, however, is not limited to metals or polymers and can be any other suitable material. A number of openings are cut in the protective cap 110 by using, for example, laser drilling, chemical etching or mechanical punching. The location of the openings in the protective cap 110 are selected to be offset from the location of the port 104, so that the openings are not within a line of sight of the port 104. This configuration of openings prevents the inflow 112 of liquid or gas from directly hitting the openings, therefore protecting the pressure-sensor device 106 from high velocity liquid or gas aggressors or unwanted probing hazards, for example, during cleaning the apparatus 100.

The opening configuration of the protective cap 110 also lends itself to better allow for cleaning (relative to the existing mesh or waterproof membrane) in the event the apparatus 100 becomes soiled. Although the openings may continue to allow, to some extent, particulates to pass through and fill up the space between the protective cap 110 and the waterproof medium 108, the indirect line of sight reduces the accumulation rate of particulates under the protective cap 110. Air gaps between the particulates allow transduction of pressure as long as the particulates are not packed tightly or restrict the movement of the sensing diaphragm (not shown for simplicity). In addition, the customizable nature of the openings of the protective cap 110 allows precise control of the opening configurations such as opening locations, opening spacing, and other configuration aspects, as will be discussed herein.

FIG. 2 is a schematic diagram illustrating an existing pressure-sensing apparatus 200 with a mesh 210. The pressure-sensing apparatus 200 (hereinafter, apparatus 200) includes a housing 202, a port 204, a pressure-sensor device 206, and a gel 208, which are similar to the corresponding components in the apparatus 100. An important difference between the apparatus 100 of the subject technology and the apparatus 200 includes a mesh 210 (or a membrane), which is replaced by the apparatus 200 with the protective cap 110 of FIG. 1. One issue with the mesh 210 is that the pores of the mesh 210 are not configurable as the openings of the protective cap 110 are. For example, only the size and spacing of the pores can be controlled; their locations are not controllable, and they are uniformly spread all over the area of the mesh 210. The problem with this configuration is that some of the pores of the mesh 210, as seen from FIG. 2, are directly in the line of sight of the port 204. This allows inflow 212 to directly enter the space between the mesh 210 and the gel 208, which can cause a high accumulation rate of particulates under the mesh 210, resulting in less breathing space for the pressure-sensor device 206.

In addition, the pores in the direct line of sight of the port 204 allow the inflow 112 of high-velocity liquid or gas aggressors or unwanted probing hazards, which can directly affect the gel 208 of the pressure-sensor device 206 and cause pressure reading errors. Therefore, the replacement of the mesh 210 with the protective cap 110 of the subject technology with offset openings can reduce any error in the pressure reading of the pressure-sensor device 106, for example, due to noise, offset, or latency in pressure measurement.

FIGS. 3A, 3B, 3C, 3D, and 3E are diagrams illustrating top views 300A, 300B, 300C, 300D, and 300E of examples of protective caps of the pressure-sensing apparatus of FIG. 1, in accordance with various aspects of the subject technology. The top view 300A shows the port 104 of FIG. 1, as viewed from above the apparatus 100 along an arrow 120 shown in FIG. 1. In the top view 300A, the numerical references 302 and 304, respectively, show an edge of the port 104 and the top surface of the protective cap 110 of FIG. 1, which is in the direct line of sight from the port 104. It is clear that no openings of the protective cap 110 are within the direct line of sight from the port 104.

The top view 300B shows the projection 304 of the port 104 over the protective cap 110 and a number of openings 306, which form a circular row with a uniform distribution along the edge of the protective cap 110. The openings 306 are equally spaced (e.g., with a spacing of about 100 μm) and are arranged to have a distance (offset) from the edge of the projection 304. This is to make sure that any inflow from the port 104 could not directly enter the openings 306, as discussed above.

The top view 300C shows the projection 304 of the port 104 over the protective cap 110 and a number of openings 308, which are arranged in two-opening clusters and at an offset from the projection 304.

The top view 300D shows the projection 304 of the port 104 over the protective cap 110 and a number of openings 310, which are arranged in three-opening clusters and at an offset from the projection 304.

The top view 300E shows the projection 304 of the port 104 over the protective cap 110 and a number of openings 312, which are arranged in circular three-opening clusters and at an offset from the projection 304.

In some implementations, the openings 306, 308, 310, and 312 may have diameters within a range of about 10 μm to 500 μm, and a minimum value of the offset of the openings from the projection 304 can be within a range of about 100 μm to 150 μm. In one or more implementations, the openings 306, 308, 310, and 312 may be implemented as one or more slots having a slot opening with a length-to-width ratio of about 2:1 or greater.

In some implementations, the arrangement (configuration) of the openings of the protective cap is not limited to the configurations shown in the top views 300B, 300C, 300D, and 300E above and can be any configuration, for example, a random configuration with multi-opening clusters.

FIG. 4 is a schematic diagram illustrating a top view 400 of the port 204 of the existing apparatus 200 of FIG. 2. The top view 400 shows the port 204 of FIG. 2, as viewed from above the apparatus 200 along an arrow 220 shown in FIG. 2. In the top view 400, the numerical references 402 and 404, respectively, show an edge of the port 204 and a portion of the top surface of the mesh 210 of FIG. 2, which is in the direct line of sight from the port 204. It is clear that some of the pores of the mesh 210 are within the direct line of sight from the port 204 and can allow the inflow 212 of, for example, high-velocity liquid or gas aggressors or unwanted probing hazards, which can directly affect the gel 208 of the pressure-sensor device 206 and cause pressure reading errors.

FIGS. 5A, 5B, 5C, and 5D are diagrams illustrating examples of a sensor device 500A with domed protective cap and sensor devices 500B, 500C, and 500D with flat protective caps, in accordance with various aspects of the subject technology. The sensor device 500A is similar to the pressure-sensor device 106 of FIG. 1, with a side wall 502 and a protective cap 510 that is domed. The domed portion 512 as shown in FIG. 5A has an indentation slope of about 30 degrees and the openings 514 are cut in the slope of the domed portion 512. In one or more implementations, the indentation slope is not limited to 30 degrees and can be within a range of about 30 to 90 degrees. One advantage of the domed protective cap is that it allows more volume under the protective cap, but less volume between the top of the protective cap and the housing (102 of FIG. 1). The indentation on the protective cap also allows water to roll off the center top part of the cap to the crease where the openings are, which could slow down the water drying time. However, the additional volume under the protective cap 510 can allow more room for particulate accumulation in the space between the waterproof medium (e.g., 108 of FIG. 1) and the protective cap.

The sensor device 500B is similar to the sensor device 500A, except that a protective cap 516 of this sensor device is flat. The configuration of the openings 518 is similar to the configuration shown in FIG. 3B and discussed above.

The sensor device 500C is similar to the sensor device 500B, except that the configuration of the openings 520 is two-opening clusters similar to the configuration shown in FIG. 3C and discussed above.

The sensor device 500D is similar to the sensor device 500B, except that the configuration of the openings 522 is three-opening clusters similar to the configuration shown in FIG. 3D and discussed above.

Although the flat protective cap design allows for less volume under the protective cap, the offset opening arrangement with the port (e.g., 104 of FIG. 1) helps to reduce the particulate accumulation rate. In addition, the flat surface allows for water to dry equally from the surface and not pool around the crease of the protective cap (as in the domed protective cap). The flat protective cap design allows for more volume above the protective cap than in the case of the domed protective cap, making it easier to drain the water, and reduces water drying time and manufacturing complexity. Diameter of the openings (514, 518, 520 or 522) can be made larger to allow better water drying characteristics such as drying time and smaller pressure offset due to receding of the water surface. The larger openings, however, can allow more particulate accumulation below the protective cap.

Further, with respect to the flat protective cap designs shown in FIGS. 5B, 5C, and 5D, the different opening configurations can be used to manipulate the way water dries through evaporation/convection. One advantage of the embodiments shown in FIGS. 5C and 5D are that the individual opening dimensions remain the same, but the arrangements of the openings and the number of openings can allow for better water drying properties (e.g., surface tension and surface properties such as hydrophobicity or surface roughness) while maintaining good resistance against particulate accumulation. Another alternate opening configuration (not included in the figures here) could be slot openings, where the openings are made in the shape of slot openings aligned in a circular pattern. The slots-opening protective cap can be similar to the flat protective cap with two-opening clusters of FIG. 5C but with the two openings 520 merged together. The slots geometry is advantageous for water drying properties but may fare a little worse against particulate accumulation. However, due to the offset opening of the port (e.g., 104 of FIG. 1) with the slots opening, particulate accumulation can be reduced.

FIG. 6 is a flow diagram illustrating an example process 600 of protecting a pressure-sensor device, in accordance with various aspects of the subject technology. The process 600 starts by disposing a pressure-sensing device (e.g., 106 of FIG. 1) in a housing (e.g., 102 of FIG. 1) including a port (104 of FIG. 1) (610). A cavity of the pressure-sensor device is partially filled with a water-protecting medium (e.g., gel, 108 of FIG. 1) or the water-protecting medium is coated over the pressure-sensor device (620). A protecting cap (e.g., 110 of FIG. 1) including multiple openings (e.g., 306 of FIG. 3B) is disposed over the pressure-sensor device so that the openings are offset from a projection (e.g., 304 of FIG. 3B) of the port on the protecting cap (630).

FIG. 7 illustrates a wireless communication device 700 within which some aspects of the subject technology are implemented. In one or more implementations, the wireless communication device 700 can be a tablet, a smartphone, a smartwatch, or other electronic devices that includes a pressure sensor. The wireless communication device 700 may include a radio frequency (RF) antenna 710, a duplexer 712, a receiver 720, a transmitter 730, a baseband processing module 740, a memory 750, a processor 760, a local oscillator generator (LOGEN) 770, and a transducer module 780. In various aspects of the subject technology, one or more of the blocks represented in FIG. 7 may be integrated on one or more semiconductor substrates. For example, the blocks 720-770 may be realized in a single chip, a single system on a chip, or in a multichip chipset.

The receiver 720 may include suitable logic circuitry and/or code that may be operable to receive and process signals from the RF antenna 710. The receiver 720 may, for example, be operable to amplify and/or down convert received wireless signals. In various aspects of the subject technology, the receiver 720 may be operable to cancel noise in received signals and may be linear over a wide range of frequencies. In this manner, the receiver 720 may be suitable for receiving signals in accordance with a variety of wireless standards such as Wi-Fi, WiMAX, Bluetooth, and various cellular standards. In various aspects of the subject technology, the receiver 720 may not use any sawtooth acoustic wave filters and few or no off-chip discrete components such as large capacitors and inductors.

The transmitter 730 may include suitable logic circuitry and/or code that may be operable to process and transmit signals from the RF antenna 710. The transmitter 730 may, for example, be operable to upconvert baseband signals to RF signals and amplify RF signals. In various aspects of the subject technology, the transmitter 730 may be operable to upconvert and amplify baseband signals processed in accordance with a variety of wireless standards. Examples of such standards may include Wi-Fi, WiMAX, BT, and various cellular standards. In various aspects of the subject technology, the transmitter 730 may be operable to provide signals for further amplification by one or more power amplifiers.

The duplexer 712 may provide isolation in the transmit band to avoid saturation of the receiver 720 or damaging parts of the receiver 720, and to relax one or more design requirements of the receiver 720. Furthermore, the duplexer 712 may attenuate the noise in the receive band. The duplexer 712 may be operable in multiple frequency bands of various wireless standards.

The baseband processing module 740 may include suitable logic, circuitry, interfaces, and/or code that may be operable to perform the processing of baseband signals. The baseband processing module 740 may, for example, analyze received signals and generate control and/or feedback signals for configuring various components of the wireless communication device 700, such as the receiver 720. The baseband processing module 740 may be operable to encode, decode, transcode, modulate, demodulate, encrypt, decrypt, scramble, descramble, and/or otherwise process data in accordance with one or more wireless standards.

The processor 760 may include suitable logic, circuitry, and/or code that may enable processing data and/or controlling operations of the wireless communication device 700. In this regard, the processor 760 may be enabled to provide control signals to various other portions of the wireless communication device 700. The processor 760 may also control the transfer of data between various portions of the wireless communication device 700. Additionally, the processor 760 may enable implementation of an operating system or otherwise execute code to manage operations of the wireless communication device 700. In one or more implementations, the processor 760 may be interfaced with the transducer module 780 via standard host interface technologies such as an inter-integrated circuit (I2C), a serial interface protocol (SPI), a peripheral component interconnect express (PCIE), a universal asynchronous receiver transmitter (UART), and/or other interface technologies, depending on the data rate needed to sample and pipe from the transducer module to the processor 760.

The memory 750 may include suitable logic, circuitry, and/or code that may enable storage of various types of information such as received data, generated data, code, and/or configuration information. The memory 750 may include, for example, RAM, ROM, flash, and/or magnetic storage. In various aspects of the subject technology, information stored in the memory 750 may be utilized for configuring the receiver 720 and/or the baseband processing module 740.

The LOGEN 770 may include suitable logic, circuitry, interfaces, and/or code that may be operable to generate one or more oscillating signals of one or more frequencies. The LOGEN 770 may be operable to generate digital and/or analog signals. In this manner, the LOGEN 770 may be operable to generate one or more clock signals and/or sinusoidal signals. Characteristics of the oscillating signals such as the frequency and duty cycle may be determined based on one or more control signals from, for example, the processor 760 and/or the baseband processing module 740.

In operation, the processor 760 may configure the various components of the wireless communication device 700 based on a wireless standard according to which it is designed to receive signals. Wireless signals may be received via the RF antenna 710, amplified, and down converted by the receiver 720. The baseband processing module 740 may perform noise estimation and/or noise cancellation, decoding, and/or demodulation of the baseband signals. In this manner, information in the received signal may be recovered and utilized appropriately. For example, the information may be audio and/or video to be presented to a user of the wireless communication device 700, data to be stored to the memory 750, and/or information affecting and/or enabling operation of the wireless communication device 700. The baseband processing module 740 may modulate, encode, and perform other processing on audio, video, and/or control signals to be transmitted by the transmitter 730 in accordance with various wireless standards. In one or more implementations, the transducer module 780 may include, but is not limited to, the apparatus 100 of FIG. 1. In one or more implementations, the processor 760 may process signals received from the apparatus 100 and, for example, prepare the signals for displaying to a user.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Various functions described above can be implemented in digital electronic circuitry, as well as in computer software, firmware, or hardware. The techniques can be implemented by using one or more computer program products. Programmable processors and computers can be included in or packaged as mobile devices. The processes and logic flows can be performed by one or more programmable processors and by one or more programmable logic circuitries. General and special-purpose computing devices and storage devices can be interconnected through communication networks.

Some implementations include electronic components such as microprocessors, storage, and memory that store computer program instructions in a machine-readable or computer-readable medium (alternatively referred to as computer-readable storage media, machine-readable media, or machine-readable storage media). Some examples of such computer-readable media include RAM, ROM, and flash memory. The computer-readable media can store a computer program that is executable by at least one processing unit and include sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessors or multicore processors that execute software, some implementations are performed by one or more integrated circuits such as application-specific integrated circuits (ASICs) or field-programmable gate arrays (FPGAs). In some implementations, such integrated circuits execute instructions that are stored on the circuit itself.

As used in this specification and any claims of this application, the terms "computer," "processor," and "memory" all refer to electronic or other technological devices. These terms exclude people or groups of people. For the purposes of the specification, the terms "display" or "displaying" shall mean displaying on an electronic device. As used in this specification and any claims of this application, the terms "computer-readable medium" and "computer-readable media" are entirely restricted to tangible, physical objects that store information in a town that is readable by a computer. These terms exclude any wireless signals, wired download signals, and any other ephemeral signals.

To provide for interaction with a user, implementations of the subject matter described in this specification can be implemented on a computer having a display device as described herein for displaying information to the user and a keyboard and a pointing device, such as a mouse or a trackball, by which the user can provide input to the computer. Other kinds of devices can be used to provide for interaction with a user as well for example, feedback provided to the user can be any form of sensory feedback such as visual feedback, auditory feedback, or tactile feedback. Input from the user can be received in any form, including acoustic, speech, or tactile input.

Many of the above-described features and applications are implemented as software processes that are specified as a set of instructions recorded on a computer-readable storage medium (also referred to as a computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, flash drives, RAM chips, hard drives, and EPROMs. The computer-readable media does not include carrier waves and electronic signals passing wirelessly or over wired connections.

In this specification, the term "software" is meant to include firmware residing in read only memory or applications stored in magnetic storage, which can be read into memory for processing by a processor. Also, in some implementations, multiple software aspects of the subject disclosure can be implemented as subparts of a larger program while remaining distinct software aspects of the subject disclosure. In some implementations, multiple software aspects can also be implemented as separate programs. Finally, any combination of separate programs that together implement a software aspect described herein is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages and declarative or procedural languages, and it can be deployed in any form, including as a stand-alone program or as a module, component, subroutine, object, or other unit suitable for use in a computing environment. A computer program may, but need not, correspond to a tile in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer, on multiple computers that are located at one site, or distributed across multiple sites interconnected by a communication network.

It is understood that any specific order or hierarchy of blocks in the processes disclosed is an illustration of an example approach. Based upon design preferences, it is understood that the specific order or hierarchy of blocks in the processes may be rearranged or that all illustrated blocks be performed. Some of the blocks may be performed simultaneously. For example, in certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language claims wherein reference to an element in the singular is not intended to mean "one and only one" unless specifically stated, but rather "one or more." Unless specifically stated otherwise, the term "some" refers to one or more. Pronouns in the masculine (e.g., his) include the feminine and neuter gender (e.g., her and its), and vice versa. Headings and subheadings, if any, are used for convenience only and do not limit the subject disclosure.

The predicate words "configured to," "operable to," and "programmed to" do not imply any particular tangible or intangible modification of a subject, but rather are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects, and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations, and vice versa.

The word "example" is used herein to mean "serving as an example or illustration." Any aspect or design described herein as an "example" is not necessarily to be construed as preferred or advantageous over other aspects or designs. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for," or, in the case of a method claim, the element is recited using the phrase "step for." Furthermore, to the extent that the terms "include," "have," or the like are used in the description or the claims, such terms are intended to be inclusive in a manner similar to the term "comprise," "comprise" is interpreted when employed as a transitional word in a claim.

What is claimed:
1. An apparatus comprising:
a housing including a port exposed to an environment;
a pressure sensor disposed within the housing and configured to measure a pressure of the environment; and
a cap including a plurality of openings disposed over the pressure sensor,
wherein the plurality of openings of the cap is configured to be offset from the port.
2. The apparatus of claim 1, wherein the environment comprises water and the pressure sensor comprises a water pressure sensor.
3. The apparatus of claim 1, wherein the environment comprises an atmosphere and the pressure sensor comprises a barometric pressure sensor.

4. The apparatus of claim 1, wherein the cap comprises a protective cap made of a mechanically sturdy and durable material including a metal, a composite material or a polymer.

5. The apparatus of claim 4, wherein the metal comprises at least one of stainless steel, titanium, tungsten, or chromium.

6. The apparatus of claim 1, wherein the cap comprises a domed protective cap.

7. The apparatus of claim 6, wherein the domed protective cap comprises a domed portion with an indentation slope within a range of about 30 to 90 degrees.

8. The apparatus of claim 1, wherein the plurality of openings comprises a row of openings around the cap and away from a projection of the port on the cap.

9. The apparatus of claim 1, wherein the plurality of openings comprises clusters of openings produced away from a projection of the port on the cap.

10. The apparatus of claim 9, wherein the clusters of openings comprise multi-opening clusters.

11. The apparatus of claim 1, further comprising a medium partially filling a sensor cavity or being coated over the pressure sensor, wherein the medium comprises a water-proofing medium including a gel.

12. The apparatus of claim 1, wherein one or more of the plurality of openings is a slot having a slot opening with a length-to-width ratio of 2:1 or greater.

13. The apparatus of claim 1, wherein the cap is disposed within the housing between the port and the pressure sensor.

14. An electronic device comprising:
a processor configured to process pressure signals; and
a pressure-sensing apparatus comprising:
    a pressure-sensor device disposed within a housing including a port and configured to measure a pressure of an environment and generate the pressure signals; and
    a cap disposed over the pressure-sensor device, wherein the cap includes multiple openings configured to be offset from a projection of the port on the cap.

15. The electronic device of claim 14, wherein the cap comprises a protective cap made of a mechanically sturdy and durable material including a metal or a polymer, and wherein the metal comprises at least one of stainless steel, titanium, tungsten, or chromium.

16. The electronic device of claim 14, wherein the cap comprises a domed protective cap including a domed portion with an indentation slope within a range of about 30 to 90 degrees.

17. The electronic device of claim 14, further comprising a water-proofing medium protecting the pressure-sensor device, wherein the water-proofing medium comprises a gel.

18. The electronic device of claim 14, wherein the multiple openings comprise a circular row of openings around the cap.

19. The electronic device of claim 14, wherein the multiple openings comprise clusters of openings including two-opening clusters or three-opening clusters.

20. An apparatus comprising:
a pressure-sensor device disposed within a housing and configured to measure a pressure of a surrounding environment; and
a protective cap disposed over the pressure-sensor device, wherein the protective cap includes a plurality of openings configured to be offset from a projection of a port of the housing on the protective cap.

21. The apparatus of claim 20, wherein the protective cap comprises a metal or a polymer, wherein the metal comprises at least one of stainless steel, titanium, tungsten, or chromium, wherein the protective cap comprises a flat surface or a domed portion, and wherein the plurality of openings comprises clusters of openings including two-opening clusters or three-opening clusters.

* * * * *